UNITED STATES PATENT OFFICE.

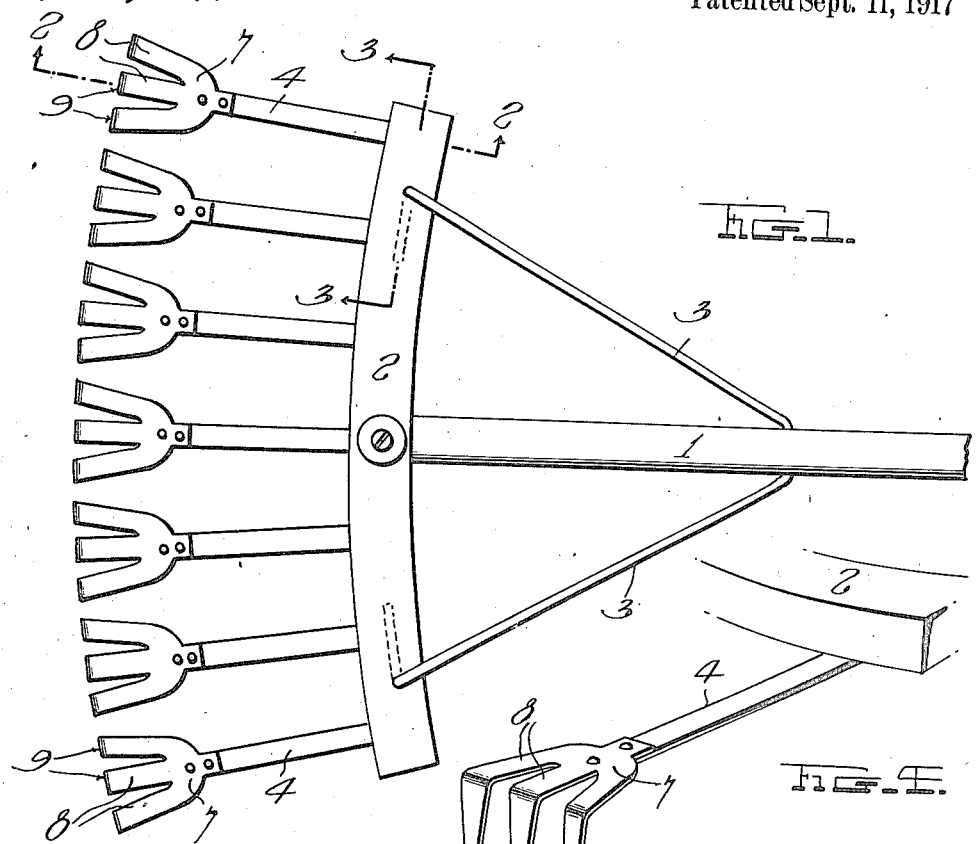

TOMOKICHI HANAMMA, OF ALAMEDA, CALIFORNIA.

LAWN-RAKE.

1,239,687.　　　Specification of Letters Patent.　　Patented Sept. 11, 1917.

Application filed May 24, 1917. Serial No. 170,749.

*To all whom it may concern:*

Be it known that I, TOMOKICHI HANAMMA, a citizen of Japan, residing at Alameda, in the county of Alameda and State of California, have invented certain new and useful Improvements in Lawn-Rakes; and I do declare the following to be a full, clear, and exact description of the invention, such as will enable others skilled in the art to which it appertains to make and use the same.

My invention has for its object to provide a simply constructed and inexpensive, yet a highly efficient rake intended primarily for use on lawns, the device being so designed as to thoroughly remove leaves and trash, even though the surface of the lawn be extremely irregular.

With the foregoing general object in view, the invention resides in the novel features of construction to be hereinafter fully described and claimed, the descriptive matter being supplemented by the accompanying drawing which forms a part of this specification and in which:—

Figure 1 is a top plan view of the improved rake;

Fig. 2 is a detail longitudinal section thereof on the plane of the line 2—2 of Fig. 1;

Fig. 3 is a detail transverse section on the plane indicated by the line 3—3 of Fig. 1; and, Fig. 4 is a perspective view of one of the claw members.

In the drawing above briefly described, the numeral 1 has reference to a suitable handle which is secured to the center of a transversely extending rake head 2 in the form of a wooden bar preferably curved throughout its length as shown, said bar being braced in respect to the handle, as shown at 3.

A number of forwardly projecting springs 4 are secured at their rear ends to the under side of the bar 2, said springs being of flat one-piece construction arranged to yield vertically. Although the springs 4 could well be attached in any suitable manner, this is preferably done by means of nails or screws 5 and staples 6, said nails or screws being driven through the rear ends of the springs into the bar 2 whereas the staples straddle said springs and are driven into said bar in advance of the fasteners 5. This connection is simple and inexpensive, yet effectively prevents lateral shifting of the springs.

Sheet metal plates 7 are riveted or otherwise secured to the front ends of the springs 4 and are stamped to form a plurality of fingers 8 whose front ends are bent downwardly to provide claws or rake teeth 9, each plate preferably having three such teeth, although any suitable number could be employed. Since the several springs 4 are of the same length, the teeth 9 will be positioned on an arcuate line whose rear ends are directed rearwardly and thus the tendency of the trash and the like being collected is to move to the center of the rake rather than to the ends thereof.

The improved rake, constructed as above described, is very efficient for removing trash and leaves from lawns although it is to be understood that the implement may be well used for other purposes. Regardless of its use, the springs 4 will exert the necessary tension on the teeth to secure the best results and said springs will permit said teeth to yield vertically as irregularities in the ground are encountered, thus preventing the rake from depositing the material previously collected thereby in depressions in the surface being raked.

From the foregoing, it will be obvious that although the improved rake is of extremely simple and inexpensive construction, it will be highly efficient and durable, and since probably the best results are attained by the specific construction shown and described, this constitutes the preferred form of the device. I wish it understood, however, that within the scope of the invention as claimed, numerous minor changes may be made without sacrificing the principal advantages. For instance either or both the handle 1 and head 2 may be made of metal if required.

I claim:

1. A rake comprising a handle, a transverse arcuate bar secured at its center to the front end of said handle, the ends of said bar curving rearwardly, flat one-piece springs secured rigidly to said bar and extending forwardly therefrom, said springs being of equal length to position their front ends on an arcuate line concentric with said bar, and metal plates rigidly secured to said front ends of the springs, said plates each having a plurality of fingers directed downwardly to form vertical claws positioned on an arc concentric with the aforesaid bar.

2. A rake comprising a handle, a transverse bar secured at its center to the front end of said handle, a plurality of one piece metallic springs secured rigidly to said bar and extending forwardly therefrom, and metal plates carried by the front ends of said springs, each of said plates having a plurality of downwardly directed fingers.

In testimony whereof I have hereunto set my hand in the presence of two subscribing witnesses.

TOMOKICHI HANAMMA.

Witnesses:
 JOSEPH BROWN,
 THOMAS EGAN.